June 19, 1928.

H. V. REED 1,674,226

DRIVEN PLATE FOR FRICTION CLUTCHES

Filed May 23, 1927

Inventor
Harold V. Reed
By Wm. O. Belt Atty.

Patented June 19, 1928.

1,674,226

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

DRIVEN PLATE FOR FRICTION CLUTCHES.

Application filed May 26, 1927. Serial No. 194,314.

This invention relates to friction clutches of the kind wherein a friction plate driven member is interposed between two parts of a driving member and is adapted to be gripped or clamped by the parts under sufficient pressure to impart motion from the driving member to a driven member.

The object of the invention is to provide a driven plate of novel construction which will absorb the noises due to periodic vibrations of the engine and prevent them from being carried forward through the clutch to parts of the assembly where they will become audible and objectionable.

A further object of the invention is to provide a novel driven plate of simple and light but substantial construction and comprising a star shaped hub member and a friction member shaped to receive the hub member, with cushion strips suitably disposed at the points of the hub member where the driving force of the friction member is applied to the hub member, to absorb the noises which otherwise might travel from the friction member to the hub member, and to confine the cushion strips in a manner to prevent their deterioration and to maintain their efficiency.

Figure 1:
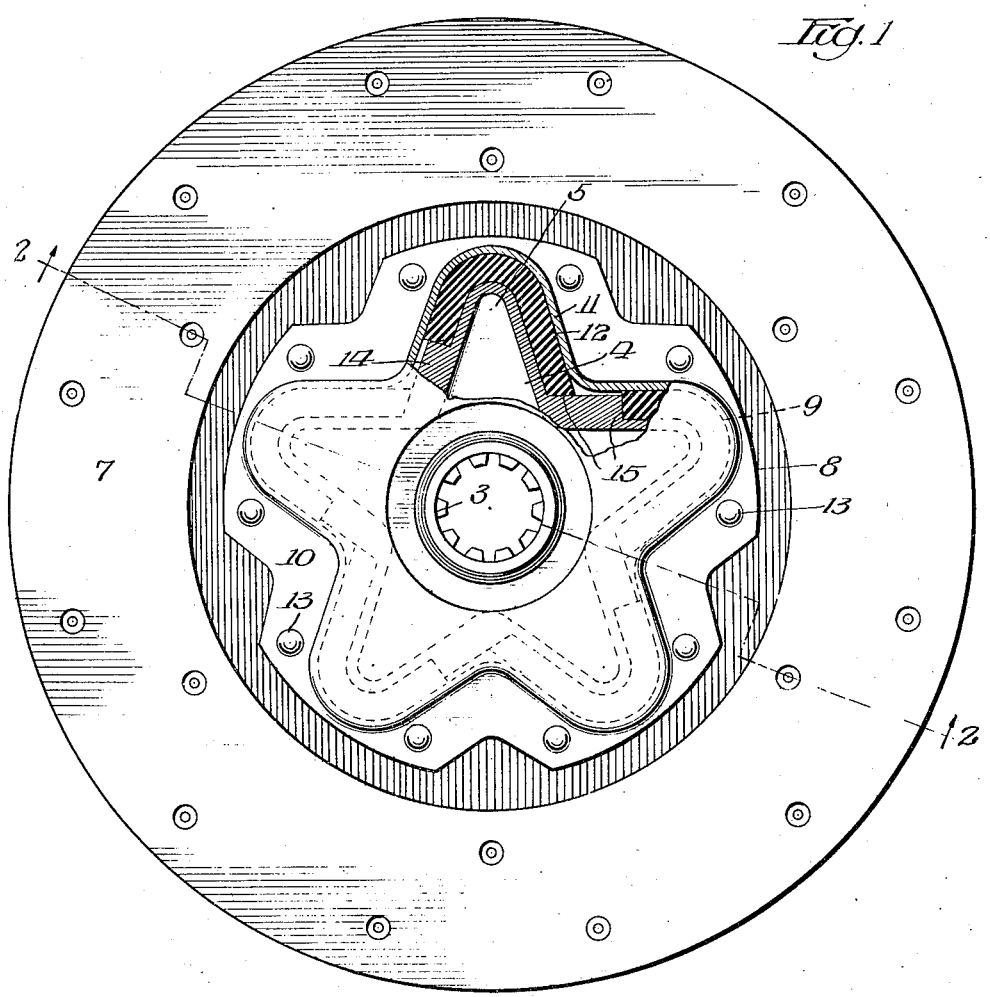
Figure 2:
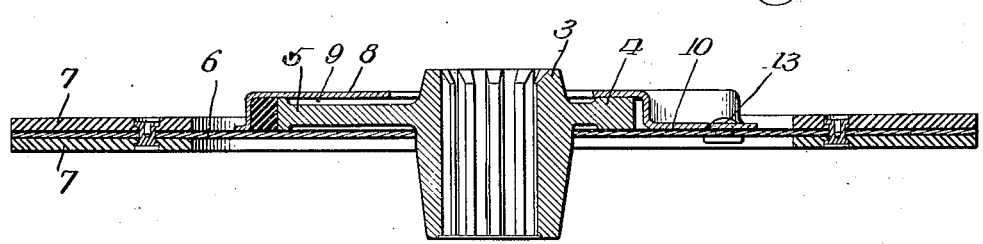

In the accompanying drawings illustrating a selected embodiment of the invention:

Fig. 1 is an elevation of the driven plate, partly broken away and partly in section, and Fig. 2 is a sectional view on the line 2—2 of Fig. 1.

Referring to the drawings the driven plate comprises a friction member which is mounted upon a centrally disposed hub member with a compressible discontinuous cushion interposed between said members so that movement of the friction member is communicated through the cushion, and by compression only thereof, to the hub member. The hub member comprises a hub 3 having a star shaped flange 4 with a plurality of points 5. The friction member comprises a flat plate ring 6 which is mounted on the hub against one side of the star shaped flange 4. Friction rings 7, 7 of suitable material are fastened to opposite sides of the plate at its periphery. A casing 8 has a star shaped cavity 9 therein and an edge flange 10 to receive the rivets 13 or other suitable fastening means by which the casing is fastened to the side of the plate ring 6. The cavity in the casing is star shaped like the flange on the hub member, but it is larger than the flange to provide a plurality of chambers 11, to receive the rubber cushion strips 12. Each of these chambers extends from the base of one point of the star shaped hub member along the side and around the end and part way down the other side of the next adjacent point. One side of each point of the star shaped hub member is enlarged at 14 to provide shoulders 15 which form the ends of the cushion chambers and against which the ends of the cushion strips abut. Thus there is a cushion chamber extending about the end of each point of the star shaped hub member, entirely down one side and partly down the other side of said point, and the ends of the chamber are bounded by a shoulder on the point about which the chamber is located and a shoulder on the next adjacent point. The cushion strip is preferably made of rubber and it fills the chamber, its ends abutting against the shoulders which form the end walls of the chamber. The long side of each cushion strip is located where the force of the friction member ordinarily will be applied through the cushion to the hub member. A cushion strip extends around each point of the star shaped hub member, down the entire side of the point where the force of the friction member is ordinarily applied, and down the other side of the point a short distance to insure an ample length of cushion strip to protect the point from contact with the casing and to prevent vibrations and noises from traveling from the friction member to the hub member. Each cushion strip is confined in its chamber and while the material of the strip may flow under compression it cannot escape from the chamber, the parts being constructed sufficiently snug for this purpose. The cushion is made discontinuous in a plurality of strips which are separated from and are entirely independent of each other. The cushion strips are not subjected to tension at any time during the operation of the driven plate and since they are entirely separate from each other and each is confined in a separate and independent chamber there will be no liability of a tensioning effect as a result of cumulative compression action which might happen if the cushion were in a single strip.

I have shown the invention in what I conceive to be a preferred construction, but I reserve the right to make any changes in the form, construction and arrangement of parts within the scope of the following claims:

I claim:

1. A driven plate for friction clutches, comprising a star shaped hub member, a friction member, a casing secured on the friction member and providing a plurality of separate chambers between itself and the hub member, and cushion strips in said chambers interposed between the points of the star shaped hub member and the casing.

2. A driven plate for friction clutches, comprising a hub member having a star shaped flange, a friction member, a casing secured to the friction member and having a star shaped cavity receiving the hub flange, there being a chamber about each point of the star shaped flange and all the chambers being separated, and cushion strips in said chambers interposed between the points of the star shaped flange and the casing.

3. A driven plate for friction clutches, comprising a star shaped hub member, a casing secured on the friction member and providing a plurality of separate chambers between itself and the hub member, each point of the star shaped hub member having an enlargement on one side providing ends for adjacent chambers, and cushion strips in said chambers interposed between the points of the star shaped hub member and the casing.

4. A driven plate for friction clutches, comprising a star shaped hub member, a casing secured on the friction member and providing a plurality of chambers between itself and the hub member, there being a separate chamber for each point of the star shaped hub member extending around the tip of the point and down substantially the entire length of one side and part way down the other side of the point, and cushion strips in said chambers interposed between the points of the star shaped hub member and the casing.

5. A driven plate for friction clutches, comprising a star shaped hub member, a casing secured on the friction member and providing a plurality of chambers between itself and the hub member, there being a separate chamber for each point of the star shaped hub member extending around the tip of the point and down substantially the entire length of one side and part way down the other side of the point, each point of the star shaped hub member having an enlargement on one side providing ends for adjacent chambers, and cushion strips in said chambers interposed between the points of the star shaped hub member and the casing.

HAROLD V. REED.